(12) United States Patent
Nelson

(10) Patent No.: US 12,123,456 B2
(45) Date of Patent: Oct. 22, 2024

(54) WEIGHT DISTRIBUTION AND STIFFENING SYSTEM FOR MODULAR FLOATING PLATFORMS

(71) Applicant: Bruce Nelson, Minneapolis, MN (US)

(72) Inventor: Bruce Nelson, Minneapolis, MN (US)

( * ) Notice: Subject to any disclaimer, the term of this patent is extended or adjusted under 35 U.S.C. 154(b) by 452 days.

(21) Appl. No.: 17/451,437

(22) Filed: Oct. 19, 2021

(65) Prior Publication Data

US 2022/0119078 A1 Apr. 21, 2022

Related U.S. Application Data

(60) Provisional application No. 63/093,578, filed on Oct. 19, 2020, provisional application No. 63/093,565, filed on Oct. 19, 2020, provisional application No. 63/093,592, filed on Oct. 19, 2020, provisional application No. 63/093,581, filed on Oct. 19, 2020.

(51) Int. Cl.
| | |
|---|---|
| *F16B 7/02* | (2006.01) |
| *B63B 7/04* | (2020.01) |
| *B63B 27/14* | (2006.01) |
| *B63B 35/44* | (2006.01) |
| *B63B 75/00* | (2020.01) |
| *B63C 1/02* | (2006.01) |
| *B63C 1/04* | (2006.01) |
| *B63C 3/00* | (2006.01) |
| *E02B 3/06* | (2006.01) |

(52) U.S. Cl.
CPC .................. *F16B 7/02* (2013.01); *B63B 7/04* (2013.01); *B63B 27/143* (2013.01); *B63B 35/44* (2013.01); *B63B 75/00* (2020.01); *B63C 1/02* (2013.01); *B63C 1/04* (2013.01); *B63C 3/00* (2013.01); *E02B 3/064* (2013.01)

(58) Field of Classification Search
CPC ............ F16B 7/02; B63B 35/44; B63B 75/00
See application file for complete search history.

(56) References Cited

U.S. PATENT DOCUMENTS

| | | | | |
|---|---|---|---|---|
| 4,604,962 | A * | 8/1986 | Guibault | B63B 35/38 |
| | | | | 14/27 |
| 5,529,013 | A * | 6/1996 | Eva, III | B63C 1/02 |
| | | | | 114/263 |
| 5,875,727 | A * | 3/1999 | Elson | B63B 35/40 |
| | | | | 114/259 |
| 5,931,113 | A * | 8/1999 | Eva, III | B63B 35/38 |
| | | | | 114/263 |

(Continued)

FOREIGN PATENT DOCUMENTS

| | | | | |
|---|---|---|---|---|
| CH | 689451 | A5 * | 4/1999 | ............ B63B 35/38 |
| CN | 208199859 | | 12/2018 | |

(Continued)

*Primary Examiner* — S. Joseph Morano
*Assistant Examiner* — Jovon E Hayes
(74) *Attorney, Agent, or Firm* — Todd R. Fronek; Larkin Hoffman; Daly & Lindgren, Ltd.

(57) ABSTRACT

A weight distribution and stiffening system is provided for modular floating platforms by creating internal channels that allow for the incorporation of stiffening members within the modular floating platform assembly. Float modules with horizontal recessed areas that are aligned with adjacent float modules to create open channels within the body of a modular floating platform.

13 Claims, 6 Drawing Sheets

(56) References Cited

U.S. PATENT DOCUMENTS

| | | | | |
|---|---|---|---|---|
| 6,006,687 | A * | 12/1999 | Hillman | B63B 3/08 |
| | | | | 114/45 |
| 6,145,463 | A * | 11/2000 | Zeilinger | B63B 35/38 |
| | | | | 405/219 |
| 6,179,525 | B1 * | 1/2001 | Gruhn | E02B 3/064 |
| | | | | 405/218 |
| 7,117,809 | B2 * | 10/2006 | Lamoureux | B63C 1/12 |
| | | | | 114/263 |
| 11,235,845 | B2 * | 2/2022 | Jackson | B63C 1/04 |
| 11,746,813 | B2 * | 9/2023 | Nelson | B63B 35/44 |
| | | | | 114/264 |
| 2004/0018054 | A1 * | 1/2004 | Rueckert | B63C 1/02 |
| | | | | 114/263 |
| 2022/0119078 | A1 * | 4/2022 | Nelson | B63B 7/04 |

FOREIGN PATENT DOCUMENTS

| | | | | |
|---|---|---|---|---|
| EP | 3904197 A1 * | 11/2021 | | B63B 3/02 |
| WO | WO-2017037749 A1 * | 3/2017 | | B63B 21/29 |

* cited by examiner

WEIGHT DISTRIBUTION AND STIFFENING SYSTEM FOR MODULAR FLOATING PLATFORMS

TECHNICAL FIELD

This description relates to weight distribution and stiffening within modular floating platforms. More particularly, the description details a system for securing support and strengthening members within modular floating platforms.

BACKGROUND

Modular floating platforms have been in use for a number of years and are increasing both in popularity and applications. Many modular floating platforms have been adapted for use as a floating vessel platform that provides a means of storing watercraft out of the water where a watercraft can be driven on top of the floating platform for dry storage. Modular floating platforms are also being used in various commercial applications as floating work platforms to support various types of equipment and structures that are used in marine environments.

Current modular floating platforms include a plurality of individual float modules that are interconnected by means of connecting tabs that project out from the corners or sides of the float modules. The connecting tabs generally have holes in their center and when the float modules are congregated for assembly, the holes in the connecting tabs of adjoining float modules are aligned so that a connecting pin can be inserted through the openings in the tabs and locked in place, thereby securing the float modules together to form a platform of the desired size and shape.

Modular floating platforms constructed in this way will generally provide sufficient buoyancy and freeboard to maintain the top surface of the floating platform off of the surface of the water so as to keep people walking on the platform dry. However, due to multiple connection points within a modular floating platform, they lack the rigidity of other types of floating platforms such as those constructed with a single larger float module or those where the float modules are connected with rigid beams or frameworks.

In situations where a modular floating platform is used to support a watercraft or heavy equipment, it is desirable to maintain rigidity in the platform. For example, in the case of a floating vessel platform, the weight of the watercraft with its keel sitting on the center area of a floating platform can cause the sides of the platform to flex upward and "cup" around the watercraft, which can impede the movement of the watercraft on the platform as it is propelled on or off the platform. When using a floating platform to support heavy equipment, it is desirable to maintain the flatness of the platform to provide a suitable walking surface for workers and to provide sufficient buoyancy to maintain the freeboard necessary to keep the surface of the platform above the water surface.

For floating vessel platforms, attempts have been made to prevent the sides of the platform from flexing upward by attaching one or more support beams underneath the platform where the support beams are attached to the outside edges of the platform to help maintain a degree of flatness. For platforms that are used to support heavy equipment where the weight load on the platform is concentrated within the footprint of the equipment, various sheets of material that are larger than the float modules, such as plywood, can be placed on the top surface of the platform to help distribute the weight of the equipment over a larger surface of the platform.

SUMMARY

The system disclosed herein involves creating internal channels within modular floating platforms for inserting support members into the body of the platform. The support members can create a skeletal-like structure that will 1) help to increase the stiffness of the platform, 2) help to maintain the flatness of the platform and 3) help to distribute the weight of objects on the platform. The internal channels are created by incorporating recessed areas in vertical faces of the float modules, where the recessed areas run from side to side and are parallel with the top and bottom of the float modules. When the float modules are assembled, the recessed area in the vertical face of one float module is directly opposite the recessed area in the vertical face of the adjoining float module thereby creating an open space within the adjoining vertical faces of the two float modules. When a series of adjacent float modules are in place to form a floating platform, open channels are created that run through the platform. A support beam or other rigid members can then be inserted into the channels from one side of the platform to the opposing side of the platform.

BRIEF DESCRIPTION OF THE DRAWINGS

Some embodiments of the system are illustrated as an example and are not limited by the figures of the accompanying drawings, in which like references may indicate similar elements and which.

DETAILED DESCRIPTION

The terminology used herein is for purposes of describing particular embodiments only and is not intended to be limiting of the system. The present disclosure is considered as an exemplification of the system and is not intended to limit the system to the specific embodiments illustrated by the figures or description below.

Figure 1:
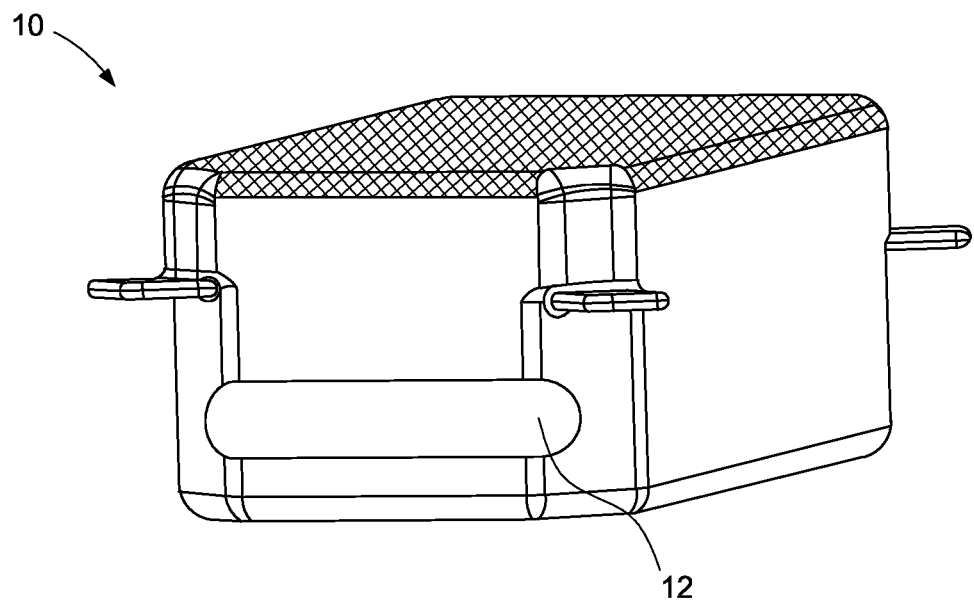
FIG. 1 is a perspective view of one example of a float module for use in a floating vessel platform with a horizontal recessed area in a vertical face of the float module.
Figure 2:
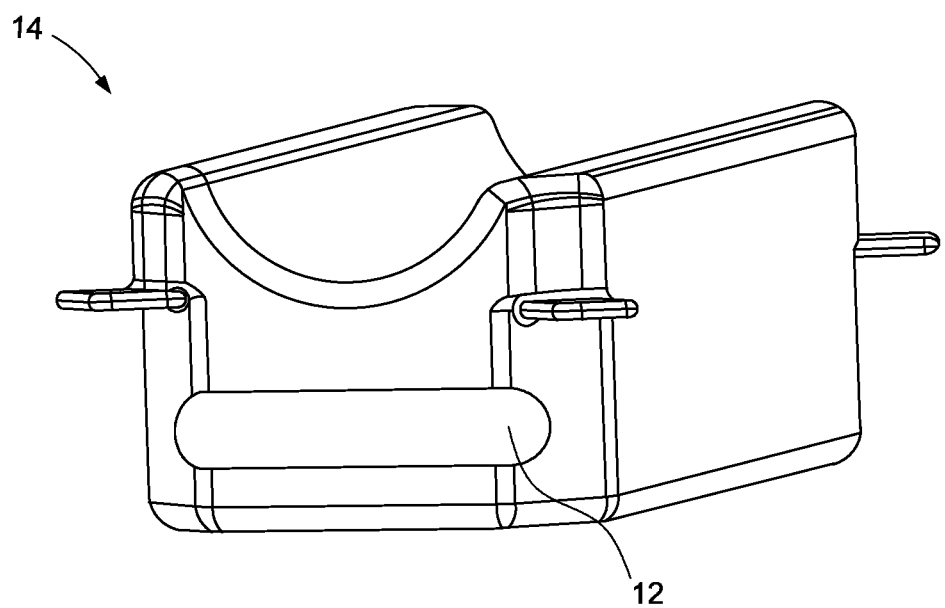
FIG. 2 is a perspective view of a second type of float module for use in a floating vessel platform with a horizontal recessed area in a vertical face of the float module.

In accordance with the system described herein, support members inserted into open channels within modular floating platforms provides an efficient means of adding to rigidness, stability and buoyancy of modular floating platforms that exceed what can be achieved by providing external support and stiffening means. As illustrated is FIGS. 1 and 2, recessed areas 12 are incorporated into vertical faces of float modules 10 and 14, respectively. In one embodiment, such recessed areas are incorporated into two opposite sides of the float modules 10 and 14. Alternatively, recessed areas can be incorporated into all four vertical sides of the float modules, thereby creating channels that run both side to side and front to back in a modular floating platform.

Figure 3:
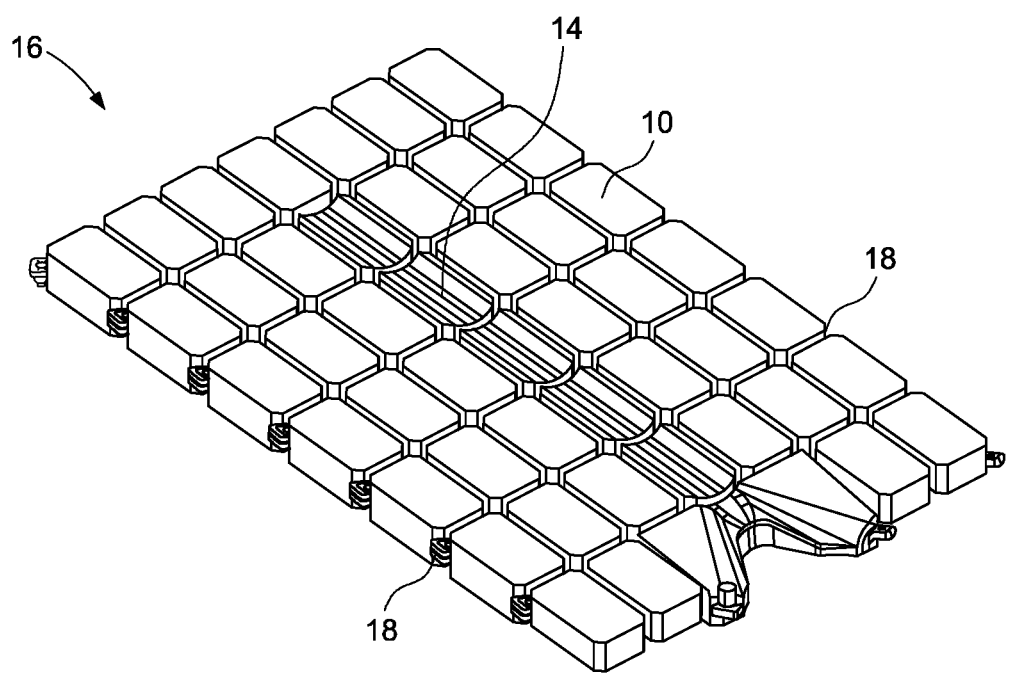
FIG. 3 is a perspective view of one type of floating vessel platform that is used for storing watercraft.
Figure 4:
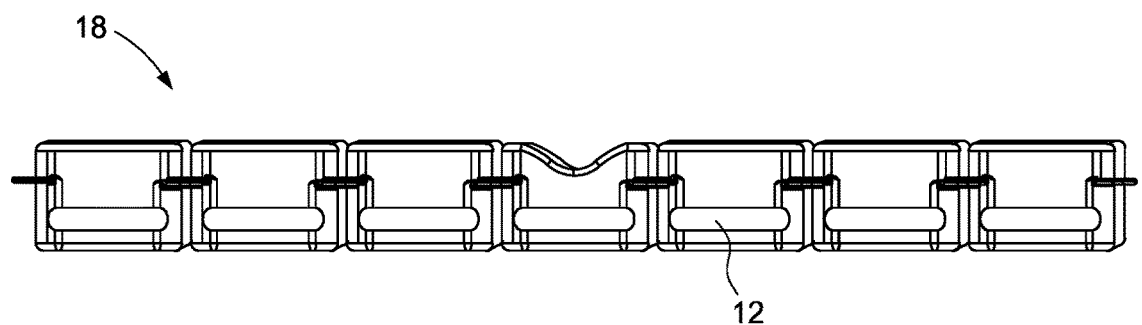
FIG. 4 is a cross-section view of the floating platform depicted in FIG. 3
Figure 5:
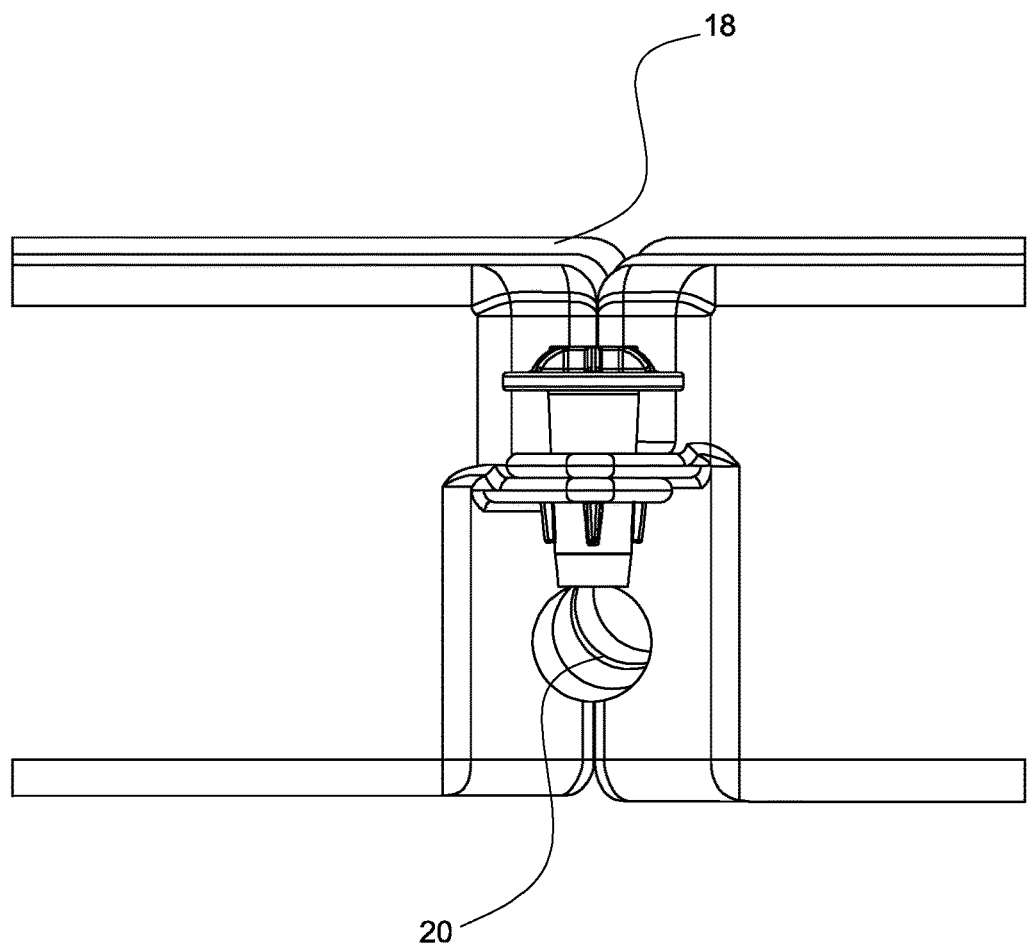
FIG. 5 is a side view of two adjoining float modules with recessed areas facing each other and creating a channel that extends through the float modules.

A plurality of float modules 10 and 14 are joined together to create a floating vessel platform such as the one illustrated in FIG. 3. When float modules 10 and 14 are joined together with other float modules, the recessed areas in the float modules of adjoining float modules are aligned, thereby creating an open channel 20 that runs through the entire floating platform from edge to edge as illustrated in FIGS. 4 and 5.

Figure 6A:
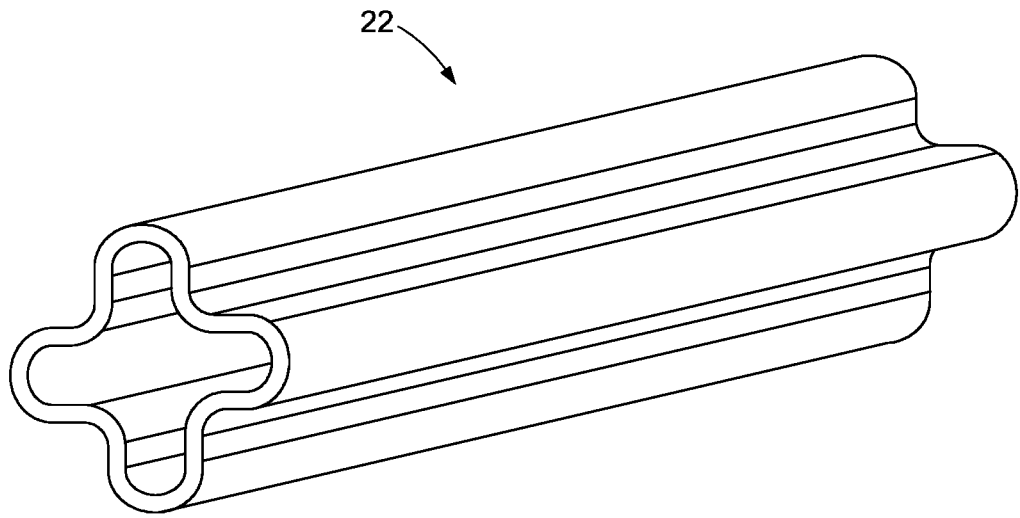
FIG. 6a is a perspective view of one type of strengthening member.
Figure 6B:
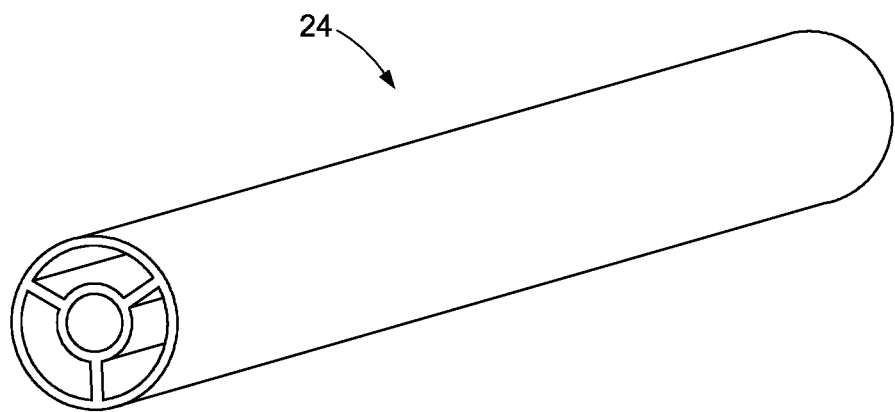
FIG. 6b is a perspective view of an alternate type of strengthening member.
Figure 7:
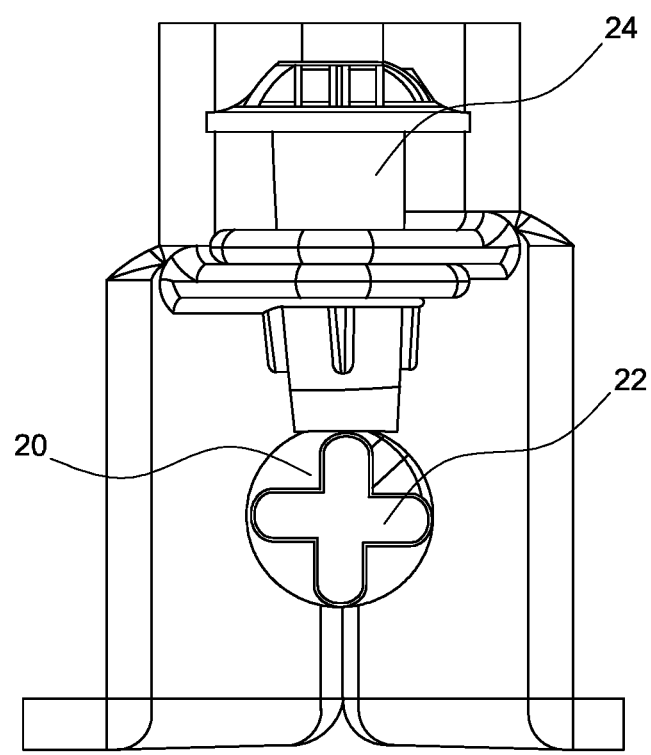
FIG. 7 is a side view of a strengthening member inserted into an internal channel of a floating platform.

A support member that is rigid and with an outside perimeter that is sized to fit into the open channels of modular floating platforms is provided. One or more of the support members are inserted into channels of the modular floating platform. The support member can be of any outer shape. One such member 22 is illustrated in FIG. 6a. An alternate member 24 is illustrated in FIG. 6b. FIG. 7 illustrates support member 22 inserted into an open channel 20 within a floating vessel platform.

In one embodiment, the recessed areas in the float modules are located such that when the support member 22 is inserted into the open channel 20, the member is positioned immediately below a connecting member 24 that secures the float modules together so that the bottom of the connecting member 24 rests on top of the support member 22. By so doing, the support member 22 helps to achieve greater rigidity to the floating platform.

Figure 8:
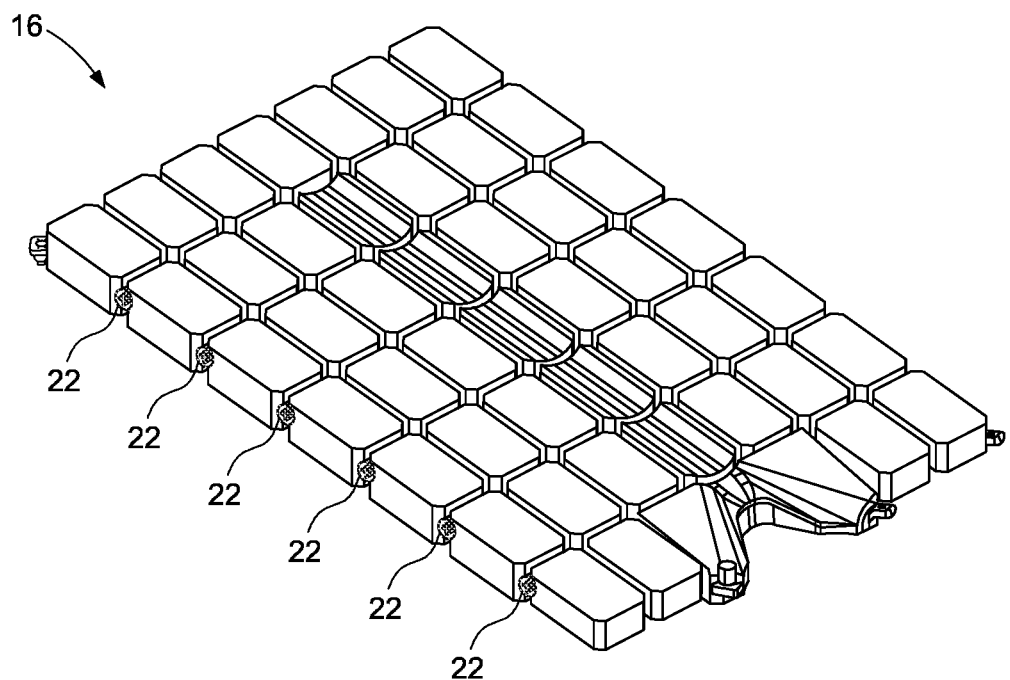
FIG. 8 is a perspective view of a floating vessel platform with strengthening members embedded in the channels of the floating vessel platform.

FIG. 8 illustrates a floating vessel platform 16 with support members 22 inserted into channels. Support members can be placed in one or as many channels as necessary to achieve the stiffness and rigidity desired for any particular application. When a heavy load is placed on the floating platform, the support members prevent the floating platform assembly from deflecting upward in areas away from the area bearing the weight and thereby helps to maintain the flatness of the floating platform and distributes weight of the load positioned thereon.

A modular floating platform comprised of float modules with recessed areas on the vertical faces of the float modules and positioned so that the recessed areas are aligned on adjoining float modules creates internal channels within the modular floating platform into which support members can be inserted. The support members, being rigid, create a skeletal-like structure within the modular floating platform that will increase the stiffness of the platform and keep the floating platform flat under heavy loads, and at the same time will distribute the weight of the load over a larger area of the floating platform. Having an internal stiffening system provides a simpler and more efficient means of achieving rigidity, distributing weight and increasing buoyancy for modular floating platforms as compared to external means.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed is:

1. A float module for use in forming an internal channel system in a modular floating platform, comprising:
   a float body including a top surface, a bottom surface, first and second opposed side surfaces and third and fourth opposed side surfaces connecting the top surface and the bottom surface;
   a first recess positioned in the first side surface, wherein the first recess extends along the first side surface from the third side surface to the fourth side surface in a direction that is parallel to the bottom surface; and
   a second recess positioned in the second side surface.

2. The float module of claim 1, further comprising a plurality of tabs extending from the float body.

3. The float module of claim 2, wherein the first recess is positioned closer to the bottom surface than the plurality of tabs.

4. The float module of claim 2, wherein the plurality of tabs each include an aperture sized to receive a connector.

5. The float module of claim 1, wherein the top surface is planar.

6. The float module of claim 1, wherein the top surface is contoured.

7. A modular floating platform, comprising:
   a plurality of float modules, each float module including a tab and positioned in one of a plurality of rows and including a recess positioned on a side surface and extending in a first direction, each recess aligned with a first corresponding recess along the first direction and facing a second corresponding recess in a second direction that is perpendicular to the first direction;
   a connector positioned through at least two tabs; and
   a stiffening member positioned within the recess, the first corresponding recess and the second corresponding recess, wherein the stiffening member is positioned below the connector.

8. The modular floating platform of claim 7, wherein at least one of the plurality of float modules includes a top, planar surface.

9. The modular floating platform of claim 7, wherein at least one of the plurality of float modules includes a top, contoured surface.

10. A method of forming a modular floating platform, comprising:
    aligning a first plurality of float modules in a first row, each module of the first plurality of float modules including a first tab and a first recess extending in a first direction, each first recess aligned with an adjacent first recess of at least one of the first plurality of float modules along the first direction;
    aligning a second plurality of float modules in a second row adjacent to the first row, each module of the second plurality of float modules including a second tab and a second recess extending in the first direction, each second recess aligned with an adjacent second recess of at least one of the second plurality of float modules along the first direction, wherein the first recesses and the second recesses together form a channel;
    a connector positioned through one first tab and one second tab; and
    positioning a stiffener member within the channel, wherein the stiffening member is positioned below the connector.

11. The method of claim 10, wherein at least one of the first plurality of float modules includes a top, planar surface.

12. The method of claim 10, wherein at least one of the first plurality of float modules includes a top, contoured surface.

13. The method of claim 10, further comprising:
aligning a third plurality of float modules in a third row, each module of the third plurality of float modules including a third recess extending in the first direction; and positioning a second stiffening member in each third recess of the third plurality of float modules.

\* \* \* \* \*